United States Patent [19]

Van Alstine

[11] Patent Number: 4,797,999
[45] Date of Patent: Jan. 17, 1989

[54] CUTTING HEAD MEMBER FOR RESISTANCE-HEATED TIRE GROOVER

[76] Inventor: Guy A. Van Alstine, 27 West Cherry Ave., Trappe, Pa. 19426

[21] Appl. No.: 96,360

[22] Filed: Sep. 11, 1987

[51] Int. Cl.$^4$ .............................................. B29D 30/68
[52] U.S. Cl. ...................................... 30/140; 30/293; 157/13
[58] Field of Search ................... 30/140, 293; 83/171; 219/221, 229, 233, 235, 237, 238, 240; 157/13

[56] References Cited

U.S. PATENT DOCUMENTS

| | | | |
|---|---|---|---|
| 2,140,478 | 12/1938 | Mossback | 30/140 |
| 2,157,151 | 5/1939 | Stackhouse | 30/140 |
| 2,230,042 | 1/1941 | Mertens | 30/140 |
| 2,240,382 | 4/1941 | Van Alstine | 30/140 |
| 2,254,974 | 9/1941 | Olson et al. | 30/140 |
| 2,618,056 | 11/1952 | Van Alstine | 30/140 |
| 2,846,059 | 7/1959 | Ruff | 219/21 |
| 2,986,204 | 5/1961 | Wilson et al. | 157/13 |

Primary Examiner—Frank T. Yost
Assistant Examiner—Michael D. Folkerts
Attorney, Agent, or Firm—James A. Drobile; Robert A. Koons, Jr.

[57] ABSTRACT

A cutting head member for rigidly retaining the substantially U-shaped cutting blade of a resistance-heated tire groover is disclosed. The preferred embodiment enables the rapid and efficient adjustment or replacement of the substantially U-shaped cutting blade without the use of a wrench, screwdriver, or other working tool. A resistance-heated tire groover using the described cutting head member also is disclosed. The preferred embodiment provides precise control and regulation of the generation of heat in the substantially U-shaped cutting blade without interrupting or altering a grooving operation.

11 Claims, 5 Drawing Sheets

CUTTING HEAD MEMBER FOR RESISTANCE-HEATED TIRE GROOVER

BACKGROUND OF THE INVENTION

The invention relates to grooving of rubber tires used on various vehicles, including trucks and other motor vehicles. The invention more particularly relates to a cutting head member for a resistance-heated tire groover. The invention also relates to a resistance-heated tire groover that incorporates the disclosed cutting head member and facilitates grooving of rubber tires in a rapid, efficient, and precise manner.

It has long been known that tires for various vehicles, although worn smooth as a result of extended operation on abrasive road surfaces, nonetheless retain significant amounts of rubber on their circumferential surfaces so that new tread patterns may be cut or "grooved" into such surfaces, thereby allowing the tires to be returned to service and their operable lives extended for thousands of additional miles. Grooving of tires has been particularly prevalent in the trucking industry, where tractor/trailer vehicles can have up to 18 large tires, each of which costs several hundred dollars when purchased new. Obviously, a grooving technique that allows such tires to be rejuvenated so that their operable lives are significantly extended has found great favor with tractor/trailer owners and operators.

Previous tire groovers most often have operated by means of a heated cutting blade that slices through the rubber material on the circumferential surface of the tire being grooved. Within this broad approach, there exists two distinctly different types of construction for heating the cutting blade of a groove device.

In the first type of groover construction, heat is transferred to the cutting blade by means of a conduction heating element that generally is interposed within the metal structure of the groover, such that heat is conducted from the heating element, through some portion of the body of the apparatus, into a cutting head member, and thereafter into an attached cutting blade. Thus, in Van Alstine, U.S. Pat. No. 2,240,382, and Van Alstine, U.S. Pat. No. 2,618,056, there is disclosed generally a tire grooving tool having handles attached at each end of a hollow metal tube, with a conduction heating element concentrically interposed within the hollow metal tube at its approximate longitudinal center point, with the hollow metal tube passing through a metal cutting head that retains a cutting blade. In these devices, the heating element conducts heat radially through the walls of the metal tube, into the metal cutting head, and finally into the cutting blade mounted in the cutting head.

In Olson, et al., U.S. Pat. No. 2,254,975, there is disclosed a tire groover having a hollow metal barrel member within which a heating element is interposed, so that heat is conducted from the heating element longitudinally through the barrel member into a cutting head member at the end of the barrel member, and thereafter into a cutting blade attached to the cutting head. Similarly, in Mertens, U.S. Pat. No. 2,230,042, there is shown a tire groover having a heating element interposed within a barrel member with a cutting head member and cutting blade at the end of such barrel member, so that heat is conducted from the heating unit through the barrel member, into the cutting head member, and finally into the cutting blade.

Although tire groovers of the conduction-heating type described above are capable of suitable operation under certain circumstance, the performance of such tire groovers is deficient in several ways. Specifically, transferring heat into a cutting blade by conduction is inherently inefficient, since the heat generated by the heating element is conducted not only into the cutting blade, but also into the various other parts of the devices. In addition, heat constantly is lost to the surrounding environment by means of convection heat transfer occurring over substantially the entire surface area of the devices.

As a result of these inherent inefficiencies, it has developed that, as the cutting blades of conduction-heated tire groovers are passed through the rubber of a tire being grooved, heat is transferred from the cutting blade to the rubber at a rate that generally exceeds the rate at which heat is conducted into the blade by the heating element. In such instances, the cutting blade is rapidly cooled down to the point that continued grooving becomes difficult.

In the second type of groover construction, heat is directly generated in the cutting blade by means of a resistance-heating effect as electrical current from an external source is conducted through the cutting blade. Thus, in Ruff, U.S. Pat. No. 2,896,059, there is disclosed a tire groover wherein the ends of a U-shaped cutting blade are secured in separate electrical contact members of a cutting head, each of which contact members is electrically insulated from the other. In operation, electrical current is conducted from one of the contact members, through the cutting blade, and into the other contact member. As the electrical current passes through the blade, heat is generated within the blade as a result of resistance to the flow of electrical current through the blade.

Resistance-heated tire groovers provide the benefit of more heat being generated in the cutting blade as compared to the cutting blades of conduction-heated groovers. This in turn results in more rapid and efficient tire grooving than is possible with conduction-heated devices. However, the increased amount of heat generated in the cutting blades of resistance-heated groovers has been shown to have the disadvantage of causing the material of the cutting blades to deteriorate rapidly to the point that the the cutting blades often became heat-damaged or burn out, thereby rendering the particular groover inoperable until the cutting blade is replaced. The replacement of cutting blades in previously-known resistance-heated groovers is difficult and time-consuming, in that bolts or screws must be loosened with a wrench, screwdriver, or other working tool, and thereafter retightened, in order to replace a cutting blade. The frequency of this difficulty is increased by the fact that, in addition to replacing burned-out cutting blades, it often is necessary to adjust or replace cutting blades in order to effect different tread depths or patterns during a particular grooving operation.

Another disadvantage of previously-known resistance-heated groovers is that the means of energizing and de-energizing such devices, and thereby controlling the generation of heat in the cutting blades, is awkward and cumbersome and tends to slow grooving of tires. This is because the switch actuators of previously-known resistance groovers either are remotely located at the external current source or are so situated on the devices themselves that the operator must alter or interrupt a grooving operation in order to energize or de-energize the grooving device. Thus, it is extremely difficult to control and regulate precisely the generation of heat in the cutting blades of such devices, which slows grooving operations and increases the frequency at which cutting blades become heat-damaged or burn out.

OBJECTS OF THE INVENTION

It is an object of this invention to provide a cutting head member for a resistance-heated tire groover that greatly reduces the time and effort required to adjust or replace the cutting blade of the groover as compared to previous resistance-heated groovers.

It is a further object of this invention to provide a cutting head member for a resistance-heated tire groover having a cutting blade retaining mechanism that allows the adjustment or replacement of cutting blades without the use of wrenches, screwdrivers, or other working tools.

It is yet another object of this invention to provide a resistance-heated tire groover wherein the generation of heat in the cutting blade can be regulated and controlled precisely by the operator without interrupting or altering a grooving operation.

These and other objects of the invention will be better appreciated after reading the succeeding description of the invention in conjunction with the accompanying drawings.

SUMMARY OF THE INVENTION

The disclosed invention provides a cutting head member for a resistance-heated tire groover that permits rapid adjustment or replacement of cutting blades without the use of wrenches, screw drivers, or other working tools, and without the resulting difficulty and loss of time associated with adjusting or replacing cutting blades in previously-known resistance-heated tire groovers. The disclosed invention also provides a resistance-heated tire groover having a convenient and effective means of precisely controlling and regulating the generation of heat in the cutting blade without requiring the operator to interrupt or alter a grooving operation.

The disclosed cutting head member has a metal cutting head housing that is divided into two sub-housings that are electrically insulated from each other. The cutting head housing is adapted to slidably accept and retain a plurality of metal clamping spacers. The plurality of clamping spacers is divided into two parts, each of which is separated from the other by a floating insulator slidably interposed within the cutting head housing, so that the clamping spacers on one side of the floating insulator are in contact only with each other and with one of the sub-housings, while the clamping spacers on the the other side of the floating insulator are in contact only with each other and with the other sub-housing. One of the sub-housings is provided with a threaded locking piece which, when advanced, causes the plurality of clamping spacers and the floating insulator to tighten against each other and against the ends of a substantially U-shaped metal cutting blade interposed between the clamping spacers.

The apparatus incorporates an electrical circuit that is connected to an external transformer of a type that is well-known and which produce a direct electrical current to the apparatus at a desired amperage and voltage. In operation, electrical current from the transformer is conducted through a substantially U-shaped cutting blade that is interposed between the clamping spacers of the apparatus so that one end of the cutting blade is rigidly retained between the clamping spacers on one side of the floating insulator and the other end of the cutting blade is rigidly retained between the floating spacers on the other side of the floating insulator.

The disclosed tire grooving apparatus has at least one handle attached to the cutting head member, which handle incorporates a switch actuator that is interposed within the electrical circuit of the apparatus. This switch actuator allows an operator to control and regulate precisely the generation of heat within the cutting blade without interrupting or altering a grooving operation. In this manner, sufficient heat can be maintained in the cutting blade to enable a rapid end efficient grooving operation, while at the same time assuring that excess heat is not allowed to build up in the cutting blade.

DETAILED DESCRIPTION OF THE PREFERRED EMBODIMENT OF THE INVENTION

Figure 1:
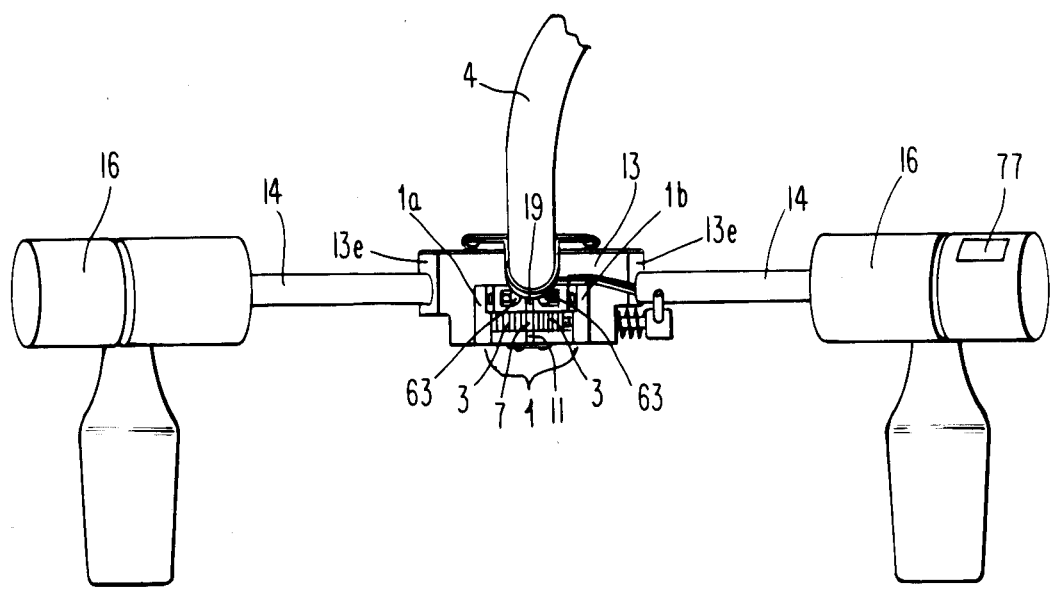
FIG. 1 is a plan view of the preferred embodiment of the invention.
2.
Figure 2:
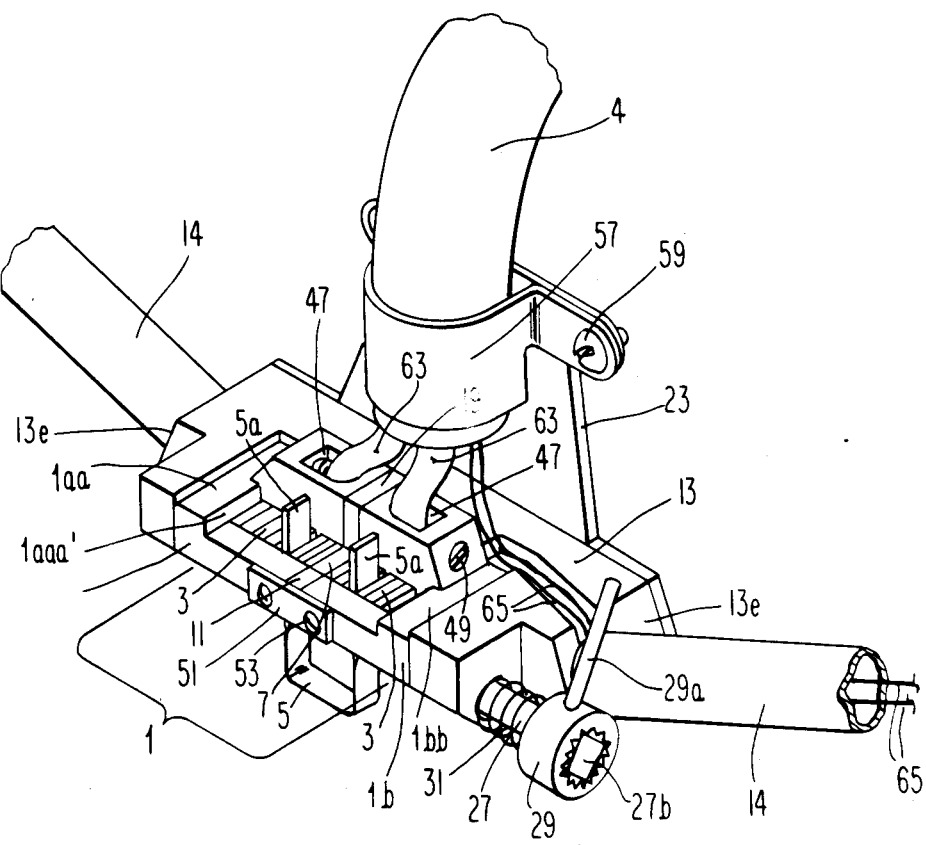
FIG. 2 is a partial perspective view of the preferred embodiment of the invention.
3.

Viewing FIGS. 1 and 2, it will be seen that a preferred embodiment of the invention comprises generally a metal cutting head housing 1 that is divided into a first sub-housing 1a and a second sub-housing 1b. Head holder 13 is adapted to receive and retain sub-housings 1a and 1b in rigid engagement with each other. Handles 14 are rigidly attached to the slanted sides 13e of head holder 13, so that handles 14 extend upwardly from head holder 13 at a slight angle, thereby increasing control and maneuverability of the apparatus by an operator. Handgrips 16 are concentrically attached to the ends of handles 14. Sub-housings 1a and 1b are electrically insulated from each other by stationary insulators 11 and 19. A plurality of metal clamping spacers 3 is slidably interposed within sub-housings 1a and 1b of cutting head housing 1. Floating insulator 7 is slidably interposed within cutting head housing 1 and between clamping spacers 3 so that the clamping spacers 3 on one side of floating insulator 7 are retained within sub-housing 1a, and the clamping spacers 3 on the other side of floating insulator 7 are retained within sub-housing 1b. A threaded locking piece 27 is provided for tightening clamping spacers 3 and floating insulator 7 against each other and against the ends 5a of a substantially U-shaped metal cutting blade 5 inserted between clamping spacers 3 as shown in FIG. 2. Direct electrical current is provided to sub-housings 1a and 1b from an external transformer source through primary electrical conductors 63 of power cable 4. Switch 77 for controlling the flow of electrical current to sub-housings 1a and 1b is mounted on handle 14 and recessed within hand-grips 16.

Figure 3:
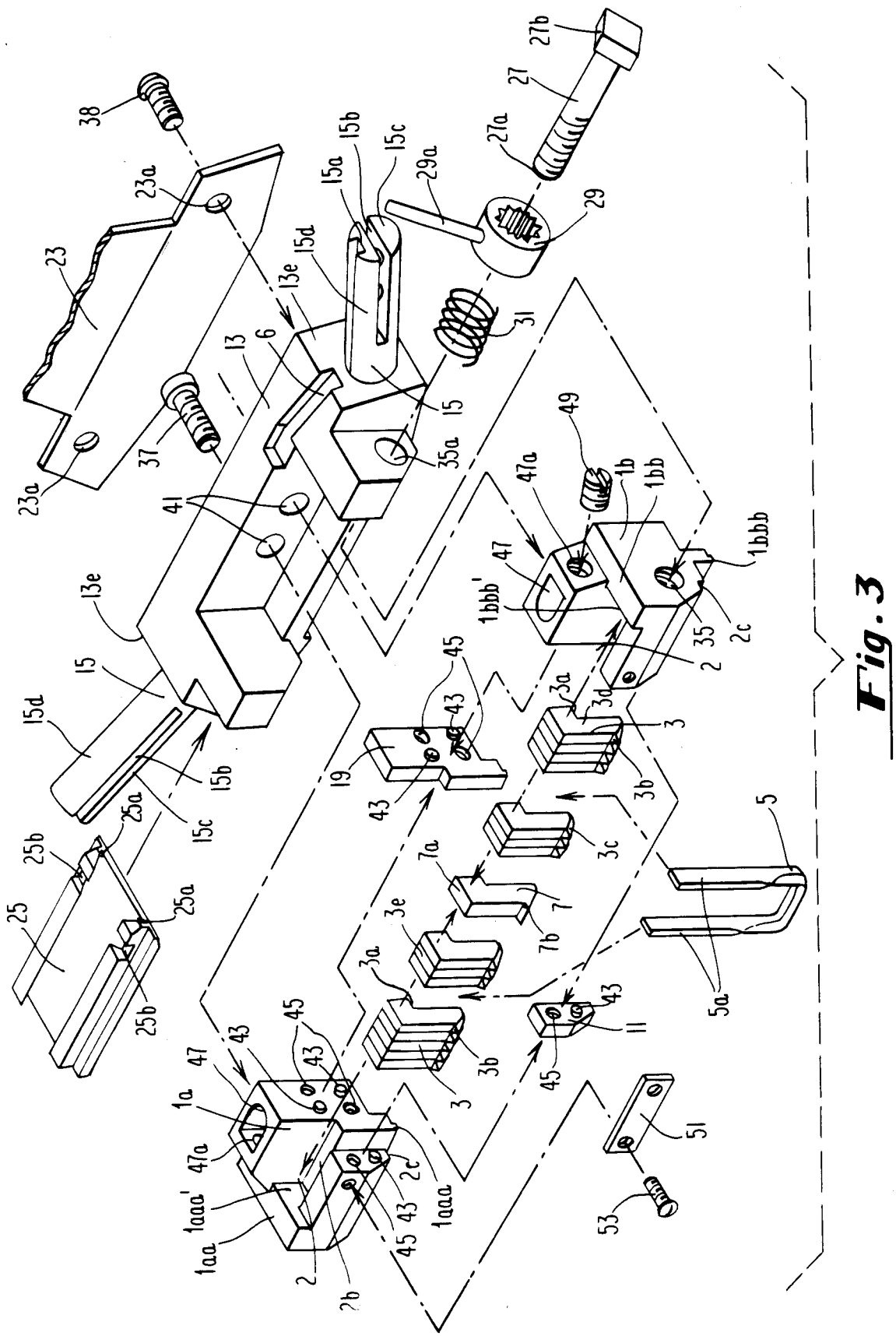
FIG. 3 is a partial perspective view in "exploded" form of the preferred embodiment of the invention.
4.
Figure 4:
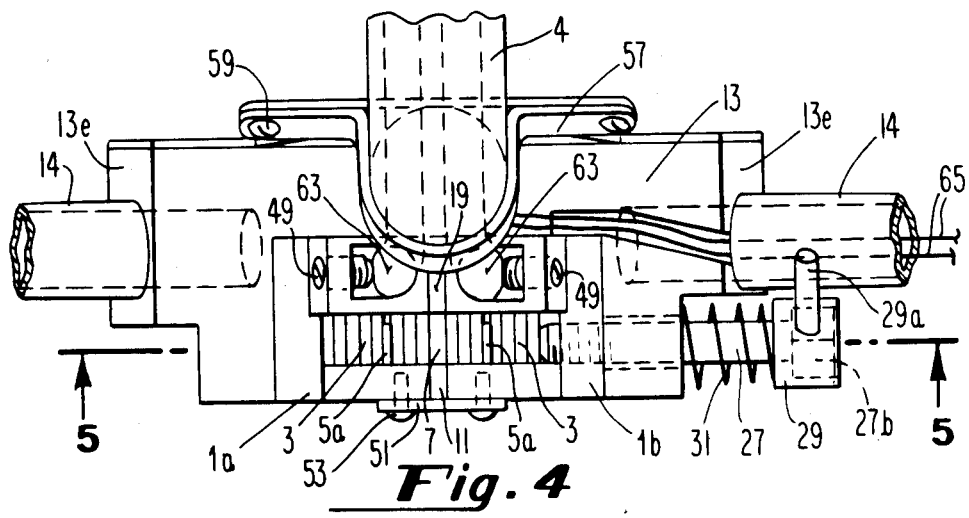
FIG. 4 is a top partial view of the preferred embodiment of the invention.
5.

Now viewing more particularly FIG. 2 in conjunction with FIG. 3, it will be seen that sub-housings 1a and 1b of cutting head housing 1 have a longitudinal channel 2 formed therein. Channel 2 extends vertically through sub-housings 1a and 1b from upper external surfaces 1aa and 1bb to lower external surfaces 1aaa and 1bbb. Channel 2 terminates horizontally at interior surfaces 1aaa' and 1bbb' of sub-housings 1a and 1b. The walls of channel 2 are configured to incorporate upper bearing surface 2b and lower bearing surface 2c. Clamping spacers 3 have upper retaining surfaces 3a and lower retaining surfaces 3b formed therein. When clamping spacers 3 are interposed within channel 2, upper retaining surfaces 3a slidably engage upper bearing surface 2b, and lower retaining surfaces 3b slidably engage lower bearing surface 2c.

It will be appreciated that the cross-sectional configuration of floating insulator 7 corresponds substantially to the cross-sectional configuration of clamping spacers 3, so that upper retaining surface 7a is adapted to slidably engage upper bearing surface 2b and lower retaining surface 7b is adapted to slidably engage lower bearing surface 2c when floating insulator 7 is interposed within channel 2.

Engagement of sub-housing 1a to sub-housing 1b with insulators 11 and 19 interposed between them is facilitated by a plurality of locating dowels 43 and corresponding locating receptacles 45 formed into sub-housing 1a and 1b and stationary insulators 11 and 19. Thus, clamping spacers 3 and floating insulator 7 are slidably interposed and retained within channel 2 of sub-housings 1a and 1b, and stationary insulators 11 and 19 are positioned between sub-housings 1a and 1b so that head holder 13 may receive sub-housings 1a and 1b and hold them in rigid engagement to each other with stationary insulators 11 and 19 interposed between them.

Figure 6:
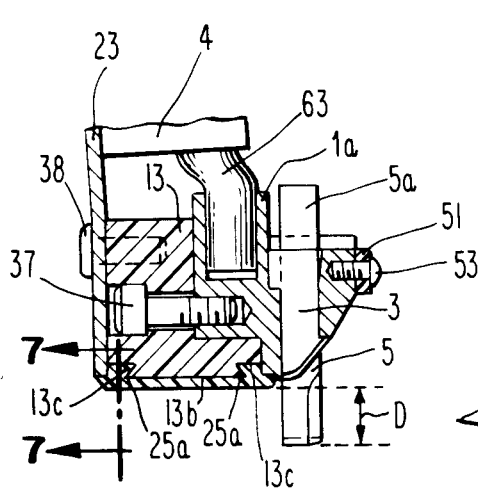
FIG. 6 is a side partial sectional view of the preferred embodiment of the invention, taken substantially along section line 6—6 of FIG. 5.
7.

In the preferred embodiment, head holder 13 is constructed of an impact-resistant plastic material so that, when sub-housings 1a and 1b are received by head holder 13, subhousings 1a and 1b remain electrically insulated from each other. Sub-housings 1a and 1b are rigidly retained within head holder 13 by means of a plurality of bolts 37 that are recessed within the rear surface 13a of head holder 13, and which pass through holes 41 in head holder 13 and threadably engage sub-housings 1a and 1b, as shown in FIG. 6.

Continuing to view FIG. 2 in conjunction with FIG. 3, it will be seen that head holder 13 is provided with aperture 35a, through which threaded locking piece 27 may be interposed and threadably engaged within threaded aperture 35 of sub-housing 1b. It will be understood that, when threaded locking piece 27 is sufficiently advanced so that the shank end 27a of threaded locking piece 27 protrudes horizontally through sub-housing 1b, shank end 27a of threaded locking piece 27 will abut planar surface 3d of the particular clamping spacer 3 that is immediately adjacent to threaded aperture 35 of sub-housing 1b. It will further be appreciated that, as threaded locking piece 27 is advanced in the direction of a normal right-handed screw, the plurality of clamping spacers 3 and floating insulator 7 will be caused to tighten against each other and against the ends 5a of a substantially U-shaped metal cutting blade 5 interposed between clamping spacers 3 as described herein.

Figure 7:
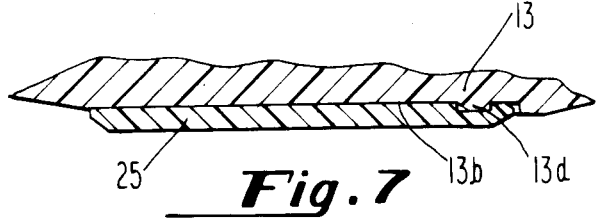
FIG. 7 is a partial rear sectional view of the preferred embodiment of the invention, taken along section line 7—7 of FIG. 6.
8.

In order to assure that sub-housings 1a and 1b remain rigidly attached to each other at all times, an additional bracing piece 51 is rigidly attached by screws 53 to sub-housings 1a and 1b. In order to minimize the frictional forces between the circumferential rubber surface of a tire being grooved and head holder 13, sliding block 25 is provided. Sliding block 25 is constructed of a friction-reducing material such as that manufactured by E. I. du Pont de Nemours and Company under the trademark "TEFLON". Sliding block 25 may be attached to lower surface 13b of head holder 13 in various ways. In the preferred embodiment, sliding block 25 is attached to lower surface 13b of head holder 13 by means of locating grooves 25a and locking notches 25b. As shown more particularly in FIGS. 6 and 7, locating grooves 25a and locking notches 25b are configured so that sliding pad 25 slidably engages locating ridges 13c formed into head holder 13 and snaps into place on locking tabs 13d also formed into head holder 13.

Figure 8:
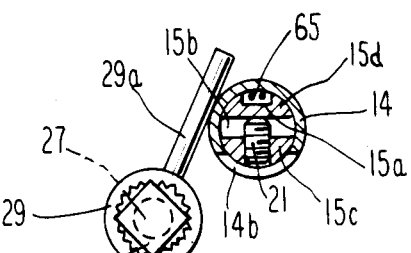
FIG. 8 is a side partial sectional view of the preferred embodiment of the invention, taken along section line 8—8 of FIG. 5.
9.

Although handles 14 can be attached to head holder 13 in a variety of ways, it will be seen in FIGS. 2 and 3 that, in the preferred embodiment, head holder 13 is provided with mounting stubs 15 for handles 14 constructed of tubular stock. Viewing more particularly FIGS. 5 and 8, it will be appreciated that mounting stubs 15 incorporate a longitudinal spacer slot 15b and a channel 15a for secondary electrical conductors 65 as hereinafter described. Handles 14 may be attached to mounting stubs 15 by interposing mounting stubs 15 concentrically within the ends of handles 14 constructed of tubular stock. Handles 14 are rigidly retained in position around mounting stubs 15 by means of locking screws 21 which are inserted through slots 14b in handles 14, so that locking screws 21 are threadably engaged within the lower halves 15c of mounting stubs 15. When locking screws 21 are advanced in the direction of a normal right-handed screw, lower halves 15c of mounting stubs 15 are caused to separate and spread apart from upper halves 15d of mounting stubs 15, so that lower halves 15c and upper halves 15d of mounting stubs 15 tightly grasp the interior circumferential surface 14b of handles 14 along the entire circumferential surface area of mounting stubs 15. Hand grips 16 may be concentrically mounted on handles 14 for convenience to an operator of the apparatus.

Returning to FIGS. 2 and 3, power cable 4 is provided with two primary electrical conductors 63 and two secondary electrical conductors 65. Power cable 4 is attached to mounting plate 23 by U-clamp 57 and a pair of screws 59. Mounting plate 23 is attached to head holder 13 by a plurality of screws 38 that pass through apertures 23a of mounting bracket 23 and threadably engage head holder 13. It will be noted in FIG. 6 that screws 38 do not engage sub-housings 1a or 1b, thereby assuring that, if screws 38 and mounting plate 23 are constructed of metal, subhousings 1a and 1b remain electrically insulated from each other.

Figure 5:
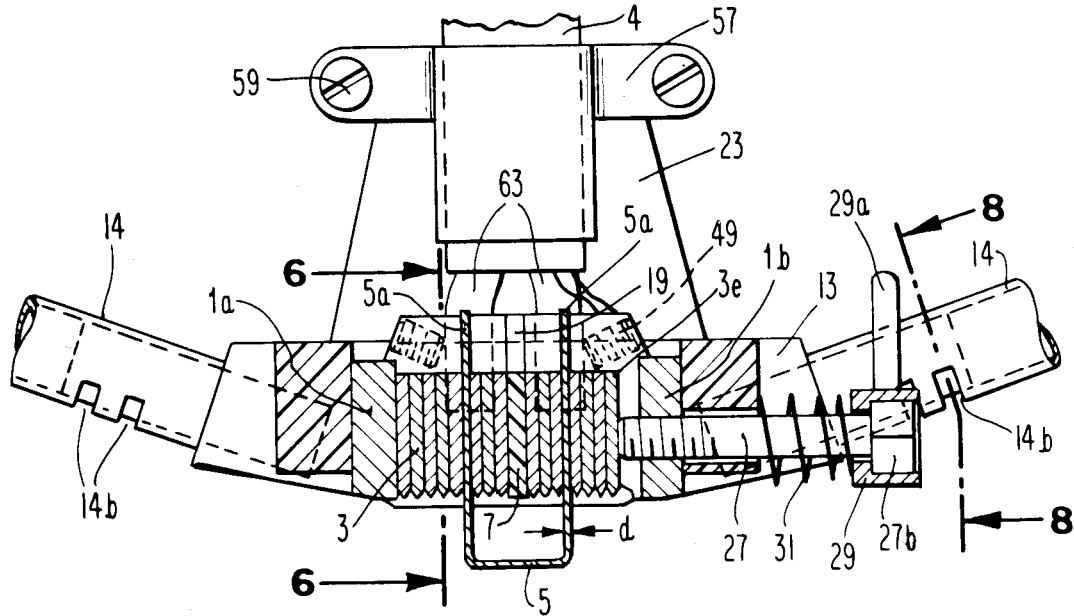
FIG. 5 is a front partial sectional view of the preferred embodiment of the invention, taken substantially along section line 5—5 in FIG. 4.
6.

After an operator has selected a cutting blade 5 desired for a particular grooving operation, threaded locking piece 27 must be sufficiently withdrawn to allow enough clearance between clamping spacers 3 and floating insulator 7 so that one end 5a of cutting blade 5 may be interposed between the clamping spacers 3 in contact with sub-housing 1a on one side of floating insulator 7, and so that the other end 5a of cutting blade 5 may be interposed between the clamping spacers 3 in contact with sub-housing 1b on the other side of floating insulator 7. In order to facilitate the insertion of ends 5a of cutting blade 5 between clamping spacers 3, lower edges 3c of clamping spacers 3 are formed into an acute angle which provides for easy separation of clamping spacer 3. Depending upon the depth of the groove desired to be cut, cutting blade 5 may be inserted between clamping spacers 3 so that ends 5a protrude an appropriate distance above the upper surfaces 3e of clamping spacers 3, as shown in FIGS. 2, 5 and 6. In this manner, the distance D shown in FIG. 6 that cutting blade 5 extends below sliding block 25, which distance D corresponds to the depth of the groove cut by the apparatus, is easily adjustable by an operator.

Continuing to view FIGS. 2 and 3, it will be seen that socket piece 29 having handle extension 29a is adapted to be retained by threaded locking piece 27 and to slidably engage head end 27b of threaded lock piece 27. Socket piece 29 is biased into engagement with head end 27b of threaded locking piece 27 by biasing spring 31. In this manner, socket piece 29 may be rotated to advance or withdraw threaded locking piece 27, as necessary, to effect removal and replacement of cutting blade 5. It has been found that, for convenience, it is desirable to limit to less than 270 degrees the angle through which socket piece 29 must be rotated to tighten or release clamping spacers 3 and floating insulator 7 against each other and against ends 5a of cutting blade 5. It has further been found that, for most cutting blades 5 having thickness d as shown in FIG. 5, a standardized amount of clearance between clamping spacers 3 and floating insulator 7 can be provided so that clamping spacers 3 and floating insulator 7 can be tightened or loosened by rotating threaded locking piece 27 through the desired angle of less than 270 degrees. However, if an operator chooses a cutting blade 5 having ends 5a whose thickness d is abnormally large or small, such cutting blades 5 can conveniently be accommodated by having the operator overcome biasing spring 31 by manually forcing socket piece 29 against spring 31 so that socket piece 29 is disengaged from head end 27b of threaded locking piece 27. The operator then can grasp head end 27b of threaded locking piece 27 and manually advance or withdrawn locking piece 27 an appropriate amount without using socket piece 29 so that, when socket piece 29 is rotatably repositioned and released by the operator into biased engagement with head end 27b of threaded locking piece 27, clamping spacers 3 and floating insulator 7 can be tightened or loosened by rotating socket piece 29 through the desired angle of less than 270° degrees while using a cutting blade 5 having ends 5a of abnormally large or small thickness d.

Figure 11:
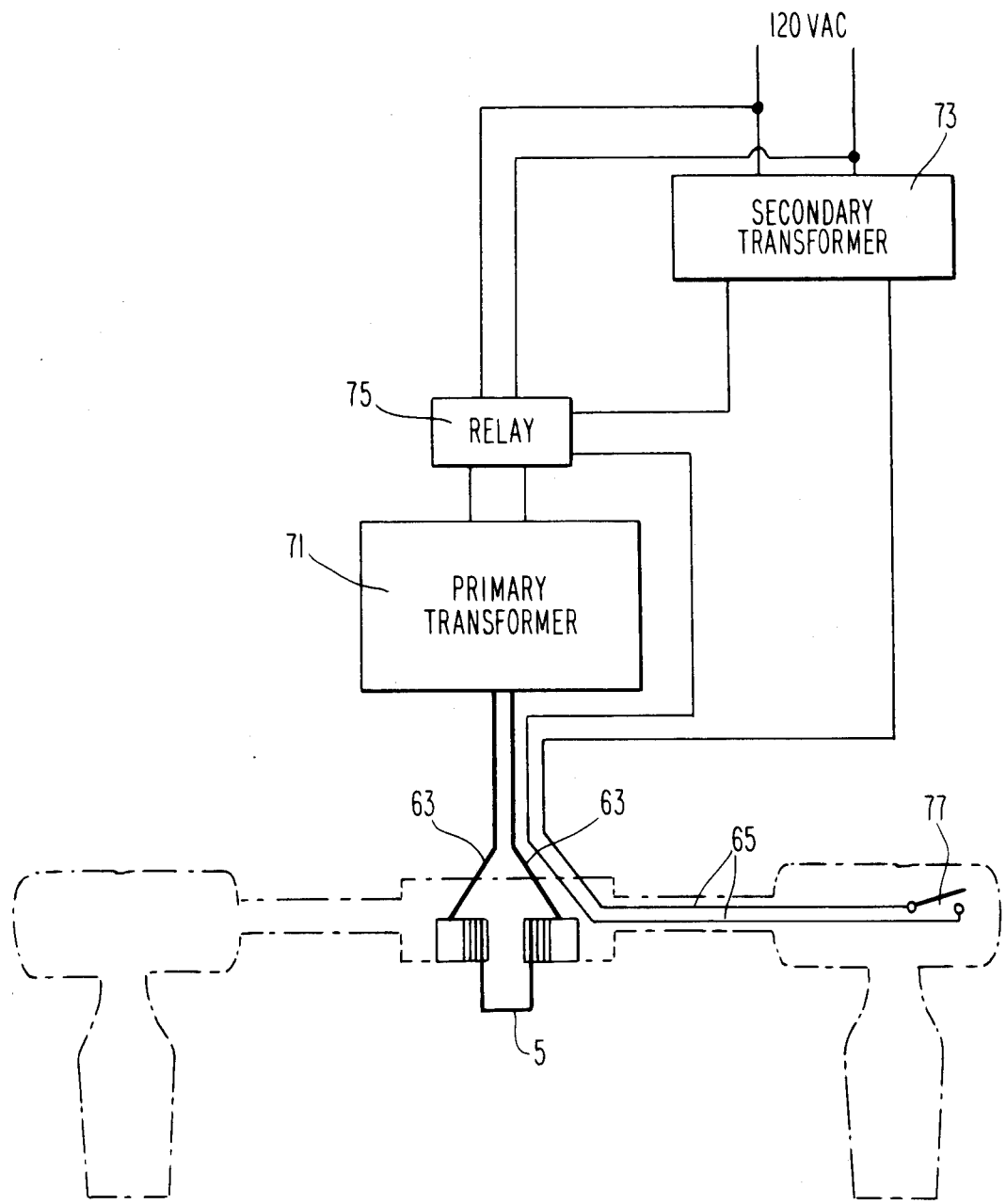
FIG. 11 is a schematic view of an electrical circuit suitable for use with the invention.

Now Viewing FIG. 11 in conjunction with FIGS. 2 and 3, it will be seen that sub-housings 1a and 1b have receptacles 47 formed therein, with threaded apertures 47a and threaded inserts 49 adapted to be tightened against the ends of primary electrical conductors 63 after they are interposed within receptacles 47. In operation, primary electrical conductors 63 of power cable 4 are connected to a primary transformer 71 of a type previously known and typically used to produce relatively low voltage and high amperage direct electrical current. Secondary electrical conductors 65 are connected to relay 75 and secondary transformer 73 of a type previously known and typically used to produce relatively low voltage and low amperage direct electrical current. Secondary electrical conductors 65 of power cable 4 are recessed within channel 6 of head holder 13 and are connected to switch 77 so that, when an operator actuates switch 77, relay 75 is energized which in turn energizes primary transformer 71 and primary electrical conductors 63.

When primary electrical conductors 63 are energized by primary transformer 71, a direct electrical current is conducted through the apparatus, thereby creating the desired resistance-heating effect in cutting blade 5. Although the amperage and voltage of the current conducted through the apparatus by primary electrical conductors 63 will vary significantly depending upon such things as the size of the groove being cut, the type of rubber being cut, the size and material of the cutting blade 5, and the desired speed of the grooving operation it has been found that such current typically may vary from approximately 50 amperes to approximately 120 amperes, while the voltage typically may vary from approximately 0.75 volts to approximately 3.0 volts. However, it is to be understood that these ranges are by way of example only and are not intended to limit the invention in any way since, depending upon the particular grooving operation, the amperes and voltage of the current conducted through primary electrical conductors 63 may be outside these ranges.

It has been found that, in addition to providing for rapid and efficient adjustment or replacement of cutting blade 5, the apparatus also enables an operator to control and regulate precisely the generation of heat in cutting blade 5. This precise control and regulation of heat generation in cutting blade 5 is accomplished by allowing an operator to energize or de-energize the apparatus by actuating or de-actuating switch 77 while continuing a grooving operation in an uninterrupted and unaltered manner. This precise control of heat generation in cutting blade 5 in turn permits a faster and more efficient grooving operation while at the same time significantly reducing the number of cutting blades 5 that are heat-damaged or burned out due to excessive electrical current being conducted through them.

It will be appreciated that there are considerable variations that can be accomplished in an apparatus of the invention without departing from its scope. As a result, although the preferred embodiment of an apparatus of the invention has been described above, it is emphasized that the invention is not limited to the preferred embodiment, and there exist alternative embodiments that are fully encompassed within the invention's scope, which is intended only to be limited by the scope of the appended claims.

Figure 9:
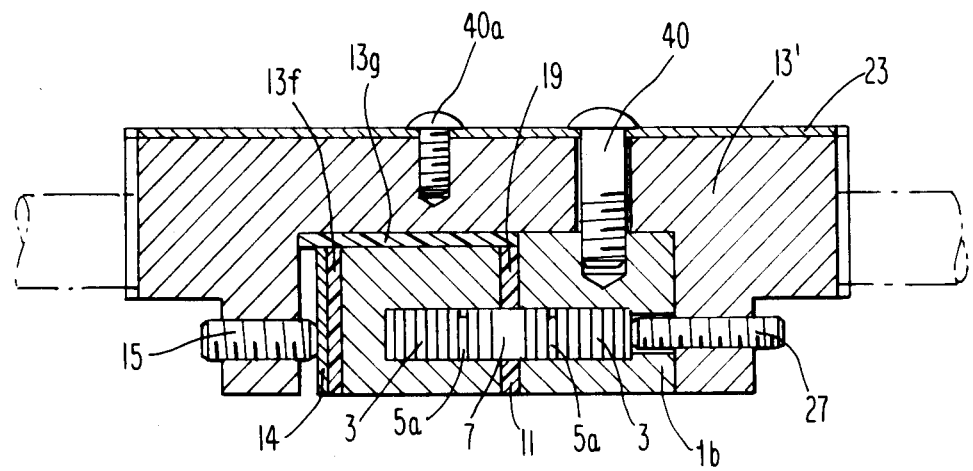
FIG. 9 is a partial top sectional view of one alternative embodiment of the invention.
10.

By way of example, although the preferred embodiment utilizes a head holder 13 that is constructed of impact-resistant plastic, it also is possible to construct a head holder 13' of metal. Such an apparatus of the invention is shown in FIG. 9. If head holder 13' is constructed of metal, it is necessary to insulate sub-housing 1a from sub-housing 1b in order to maintain the integrity and continuity of the electrical circuit through cutting blade 5. In FIG. 9, it will be seen that subhousing 1a is electrically insulated from metal head holder 13' and sub-housing 1b by insulators 13f and 13g. Sub-housing 1b is rigidly attached to head holder 13' by bolts 40. Since bolts 40 in most instances will be constructed of metal, it is necessary that any other bolts 40aa constructed of metal and used to attach mounting plate 23 to metal head holder 13' must be shorter than bolts 40 such that bolts 40a do not contact sub-housing 1a. Sub-housing 1a is rigidly retained within metal head holder 13' by set screw 15 which abuts locating plate 14, so that when set screw 15 is fully tightened, sub-housing 1a is biased against insulators 19 and 11 and against sub-housing 1b. In this manner, sub-housings 1a and 1b are held in rigid engagement to each other while remaining electrically insulated from each other and from metal head holder 13'.

Figure 10:
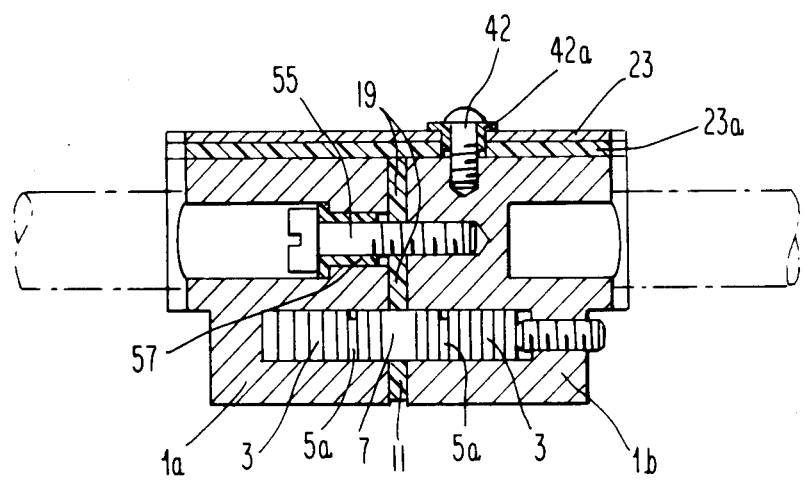
FIG. 10 is a partial top sectional view of another alternative embodiment of the invention.
11.

In another embodiment of the invention, an apparatus can be constructed without head holder 13. Thus, viewing FIG. 10, it will be seen that sub-housing 1a and 1b may be rigidly engaged to each other by metal fixing bolt 55. In order to electrically insulate sub-housing 1a from sub-housing 1b, metal fixing bolt 55 must be electrically insulated from sub-housing 1a by insulator insert 57. If mounting plate 23 is constructed of metal, it must be electrically insulated from sub-housings 1a and 1b by insulator 23a. In addition, if bolts 42 that attach mounting plate 23 to sub-housings 1a and 1b are constructed of metal, bolts 42 must be electrically insulated from mounting plate 23 by insulator inserts 42a.

I claim:

1. A cutting head member for holding the ends of a substantially U-shaped metal cutting blade in a resistance-heated tire groover, comprising:
   a. a metal housing divided into a first subhousing and a second sub-housing, the first and second subhousings having a longitudinal channel formed therein, and the first and second sub-housings being adapted to be connected to an external source of electrical current;
   b. at least one stationary insulator interposed between the first and second sub-housings so that the first and second sub-housings are electrically insulated from each other;
   c. head holder means for holding the first subhousing rigidly in engagement with the second sub-housing with the stationary insulator interposed there between, so that the first and second sub-housings are electrically insulated from each other;
   d. a plurality of metal clamping spacers slidably interposed within the longitudinal channel formed in the first and second sub-housings, for the purpose of engaging the ends of a substantially U-shaped cutting blade interposed between said metal clamping spacers;
   e. a floating insulator slidably interposed within the longitudinal channel formed in the first and second subhousings, said floating insulator separating the plurality of metal clamping spacers so that the metal clamping spacers on one side of said floating insulator are electrically insulated from the metal clamping spacers on the other side of said floating insulator, in that the metal clamping spacers on one side of said floating insulator are in contact only with each other and with the first sub-housing, while the metal clamping spacers on the other side of said floating insulator are in contact only with each other and with the second sub-housing, thereby allowing electrical current from an external source to be conducted through a substantially U-shaped metal cutting blade having one of its ends interposed between the metal clamping spacers on one side of said floating insulator and the other of its ends interposed between the metal clamping spacers on the other side of said floating insulator; and
   f. tightening means for tightening the metal clamping spacers and the floating insulator against each other and against the ends of a substantially U-shaped metal cutting blade so that one end of the substantially U-shaped metal cutting blade is rigidly retained between the metal clamping spacers on one side of the floating insulator and the other end of the substantially U-shaped metal cutting blade is rigidly retained between the metal clamping spacers on the other side of the floating insulator, thereby allowing electrical current from an external source to be conducted through the substantially U-shaped metal cutting blade to cause resistance heating therein.

2. A cutting head member for holding the ends of a substantially U-shaped metal cutting blade in a resistance-heated tire groover as recited in claim 1, wherein said head holding means further comprises a plastic head holder adapted to receive and retain the first sub-housing, the stationary insulator, and the second sub-housing, so that the first sub-housing and the second sub-housing are rigidly engaged to each other with the stationary insulator interposed between them, and further so that the first and second sub-housings are electrically insulated from each other.

3. A cutting head member for holding the ends of a substantially U-shaped metal cutting blade in a resistance-heated tire groover as recited in claims 1 or 2, wherein:
   a. each of said metal clamping spacers has at least one upper retaining surface and at least one lower retaining surface formed therein;
   b. said floating insulator has at least one upper retaining surface and at least one lower retaining surface formed therein; and
   c. said longitudinal channel has at least one upper bearing surface formed into a wall of said longitudinal channel for the purpose of slidably engaging the upper retaining surfaces of the metal clamping spacers and the floating insulator, and said longitudinal channel has at least one lower bearing surface formed into a wall of said longitudinal channel for the purpose of slidably engaging the lower retaining surface of the metal clamping spacers and the floating insulator, so that the metal clamping spacers and the floating insulator can be interposed within the longitudinal channel and slidably retained therein.

4. A cutting head member for holding the ends of a substantially U-shaped metal cutting blade in a resistance heated tire groover as recited in claim 3, wherein said tightening means further comprises a threaded locking piece having a head end and a shank end, said threaded locking piece being threadably engaged within one of the first and second sub-housings, with the shank end of said threaded piece abutting one of the metal clamping spacers slidably interposed within the longitudinal channel so that, when the threaded locking piece is advanced, the metal clamping spacers and the floating insulator are tightened against each other and against the ends of a substantially U-shaped metal cutting blade interposed between the metal clamping spacers.

5. A cutting head member for holding the ends of a substantially U-shaped metal cutting blade in a resistance-heated tire groover as recited in claim 4, further comprising:
   a. a socket piece adapted to be retained by the threaded locking piece and to slidably engage the head end of the threaded locking piece for rotation therewith; and
   b. biasing means for biasing the socket piece into engagement with the head end of the threaded locking piece so that, when said biasing means is overcome by an operator, the socket piece can be disengaged from the head end of the threaded locking piece to allow the threaded locking piece to be advanced and withdrawn without using the socket piece.

6. A resistance-heated groover for tires with a cutting head member for holding the ends of a substantially U-shaped metal cutting blade, comprising:
   a. a metal housing divided into a first subhousing and a second sub-housing, the first and second subhousings having a longitudinal channel formed therein, and the first and second sub-housings being adapted to be connected to an external source of electrical current;
   b. at least one stationary insulator interposed between the first and second sub-housings so that the first and second sub-housings are electrically insulated from each other;
   c. head holder means for holding the first subhousing rigidly in engagement with the second sub-housing with the stationary insulator interposed there between, so that the first sub-housing and the second sub-housing are electrically insulated from each other;
   d. at least one handle rigidly attached to the head holder means for grasping by an operator;
   e. a plurality of metal clamping spacers slidably interposed within the longitudinal channel formed in the first and second sub-housings, for the purpose of engaging the ends of a substantially U-shaped metal cutting blade interposed between said metal clamping spacers;
   f. a floating insulator slidably interposed within the longitudinal channel formed in the first and second subhousings, said floating insulator separating the plurality of metal clamping spacers so that the metal clamping spacers on one side of said floating insulator are electrically insulated from the metal clamping spacers on the other side of said floating insulator are in contact only with each other and with the first sub-housing, with the metal clamping spacers on the other side of said floating insulator are in contact only with each other and with the second sub-housing, thereby allowing electrical current from an external source to be conducted through a substantially U-shaped metal cutting blade having one of its ends interposed between the metal clamping spacers on one side of said floating insulator and the other of its ends interposed between the electrically conductive clamping spacers on the other side of said floating insulator;
   g. tightening means for tightening the metal clamping spacers and the floating insulator against each other and against the ends of a substantially U-shaped metal cutting blade so that one end of the substantially U-shaped metal cutting blade is rigidly retained between the metal clamping spacers on one side of the floating insulator and the other end of the substantially U-shaped metal cutting blade is rigidly retained between the metal clamping spacers on the other side of the floating insulator, thereby allowing electrical current from an external source to be conducted through the substantially U-shaped metal cutting blade to cause resistance heating therein; and
   h. a switch mounted on the handle and connected between an external electrical current source and the first and second sub-housings so that, when said switch is actuated by an operator, the cutting head member is energized and so that, when said switch is de-actuated by an operator, the cutting head member is de-energized, thereby allowing precise regulation and control of the generation of heat within the substantially U-shaped metal cutting blade during a tire grooving operation.

7. A resistance-heated groover for tires with a cutting head member for holding the ends a substantially U-shaped metal cutting blade as recited in claim 6, wherein said head holder means further comprises a plastic head holder adapted to receive and retain the first sub-housing, the stationary insulator, and the second sub-housing, so that the first sub-housing and the second sub-housing are rigidly engaged to each other with the stationary insulator interposed between them, and further so that the first and second sub-housings are electrically insulated from each other.

8. A resistance-heated groover for tires with a cutting head member for holding the ends of a substantially U-shaped metal cutting blade as recited in claims 6 or 7, wherein:
   a. each of said metal clamping spacers has at least one upper retaining surface and at least one lower retaining surface formed therein;
   b. said floating insulator has at least one upper retaining surface and at least one lower retaining surface formed therein; and
   c. said longitudinal channel has at least one upper bearing surface formed into a wall of said longitudinal channel for the purpose of slidably engaging the upper retaining surfaces of the metal clamping spacers and the floating insulator, and said longitudinal channel has at least one lower bearing surface formed into a wall of said longitudinal channel for the purpose of slidably engaging the lower retaining surfaces of the metal clamping spacers and the floating insulator, so that the metal clamping spacers and the floating insulator can be interposed within the longitudinal channel and slidably retained therein.

9. A resistance-heated groover for tires with a cutting head member for holding the ends of a substantially U-shaped metal cutting blade as recited in claim 8, wherein said tightening means further comprises a threaded locking piece having a head end and a shank end, said threaded locking piece being threadably engaged within one of the first and second subhousings, with the shank end of said threaded locking piece abutting one of the metal clamping spacers slidably interposed within the longitudinal channel so that, when the threaded locking piece is advanced, the metal clamping spacers and the floating insulator are tightened against each other and against the ends of a substantially U- shaped metal cutting blade interposed between the metal clamping spacers.

10. A resistance-heated groover for tires with a cutting head member for holding the end of a substantially U-shaped metal cutting blade as recited in claim 9, further comprising:
 a. a socket piece adapted to be retained by the threaded locking piece and to slidably engage the head end of the threaded locking piece for rotation therewith; and
 b. biasing means for biasing the socket piece into engagement with the head end of the threaded locking piece so that, when said biasing means is overcome by an operator, the socket piece can be disengaged from the head end of the threaded locking piece to allow the threaded locking piece to be advanced and withdrawn without using the socket piece.

11. A resistance-heated groover for tires with a cutting head member for holding the ends of a substantially U-shaped metal cutting blade as recited in claim 10, further comprising a sliding pad rigidly attached to the bottom of the head holder means for the purpose of contacting a tire during a grooving operation so that the friction between the head holding means and the tire is reduced.

* * * * *